April 2, 1935. A. F. ENDRES 1,996,236
PROCESS OF SWEETENING STABILIZED HYDROCARBON NAPHTHAS
AND UNSTABILIZED HYDROCARBON NAPHTHAS
Filed Sept. 14, 1932
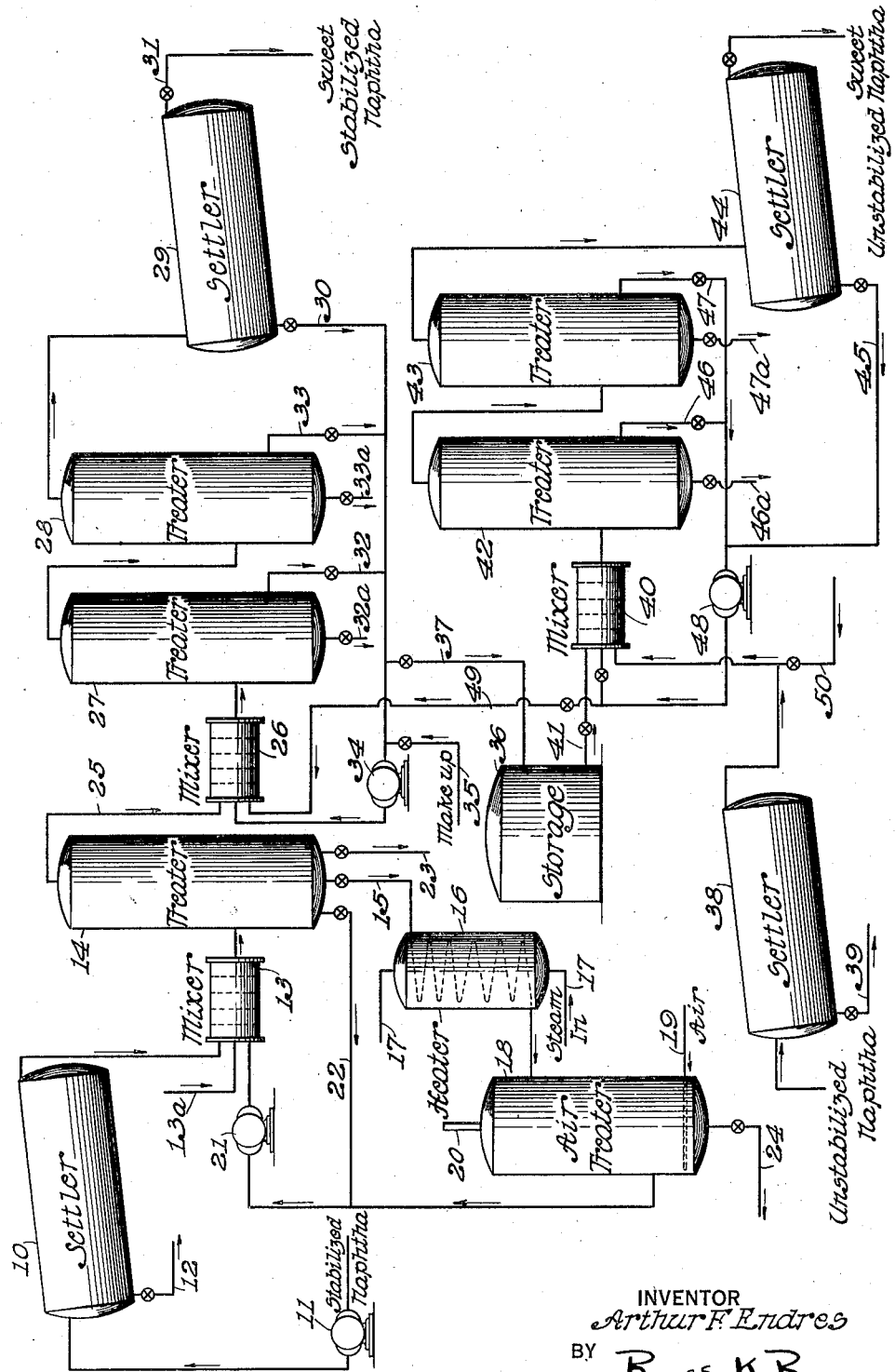
INVENTOR
*Arthur F. Endres*
BY *Bruce K. Brown*
ATTORNEY Patented Apr. 2, 1935

1,996,236

UNITED STATES PATENT OFFICE 1,996,236

PROCESS OF SWEETENING STABILIZED HYDROCARBON NAPHTHAS AND UNSTABILIZED HYDROCARBON NAPHTHAS

Arthur F. Endres, Hammond, Ind., assignor to Standard Oil Company, Chicago, Ill., a corporation of Indiana Application September 14, 1932, Serial No. 633,148

19 Claims. (Cl. 196—33)

This invention relates to the process of sweetening naphthas and it pertains more particularly to a process for sweetening different types of naphthas and regenerating the treating agent in situ.

The type of naphtha which is treated in the first stage of my process is referred to as stabilized naphthas, that is, depropanized naphthas. One source of this stabilized naphtha is from absorption plants which treat gases obtained from the cracking of mineral oils and the distillation of petroleum. These gases are contacted with an absorption oil at the absorption plant, and the light naphthas carried by these gases are absorbed with said absorption oil. The naphtha is recovered therefrom by distilling the absorption oil with the aid of steam or some equivalent means and then subjected to a stabilizing process to remove undesired excessively volatile constituents. The resulting product is usually very light with a gravity from about 70 to 95° A. P. I. Another source of stabilized naphtha which I may employ in my sweetening process is the gasoline obtained from a stabilizer operating on the product from a cracking still. Other stabilized distillates may likewise be used in the first stage of my process. The naphthas treated in the first stage of my process are stabilized naphthas or depropanized naphthas.

The naphthas that are sweetened in the second stage of my process are unstabilized or undepropanized naphthas, and they are prepared by cracking mineral oils or by distilling mineral oils. These naphthas usually have a gravity within the range of about 40 to 75 A. P. I. The naphthas sweetened in the second stage of my process are unstabilized or undepropanized naphthas.

The object of my invention is to reduce the amount of reagent necessary to sweeten hydrocarbon naphthas.

Another object is to provide a process for sweetening stabilized naphthas in the first stage of my process, and then use the spent sweetening agent to sweeten unstabilized naphthas in the second stage of the process.

A further object is to provide a process whereby the treating agent used in the second stage will be regenerated in situ simultaneously with the sweetening. Another object of my invention is to then recycle the revivified treating agent to the first stage for sweetening the stabilized naphthas.

To further understand my invention I will describe the sweetening process with reference to the accompanying drawing which forms a part of the specification.

The first stage of my process relates to the treatment of stabilized naphthas. In this particular example I used fresh absorption naphtha which had been depropanized. The naphtha is introduced into the settler 10, by the pump 11, where water and other extraneous materials are allowed to separate therefrom. At intervals the valved draw-off 12 is opened and the water and extraneous materials are withdrawn. The substantially water-free stabilized naphtha is then introduced into the mixer 13, which may be of the orifice type, where it is contacted with an alkaline caustic solution, preferably a 30% aqueous solution of sodium hydroxide. Although, varying concentrations of caustic may be used, generally a caustic solution of 12 to 40% may be satisfactorily used. The mixture of stabilized naphtha and caustic is then introduced into the treater 14 where the used caustic solution is permitted to separate from the naphtha. The caustic and stabilized naphtha remains in contact for sufficient time to permit the caustic to react with the mercaptans and other reactable products in the naphtha. The initial caustic solution is added through the feed line 13a.

The used caustic is withdrawn from the separator 14 through the valved line 15 and passed through the heater 16 where the solution is heated by steam or other heating media introduced thru the line 17. Generally the used caustic is heated to a temperature within the range of 75° F. to 210° F. The heated caustic solution is then air blown in the air treater 18. The treatment with air or oxygen bearing material, or oxidizing agent such as peroxides, is effected by introducing them through the perforated line 19. The vent 20 provides an escape for the gases used in this treatment. If desired, the air which is introduced through conduit 19 may be heated, thereby reducing the time required to revivify the caustic. Generally the caustic may be revivified by blowing with air from 1 to 5 hours. It should be understood that the hotter the air and caustic solution, the shorter will be the time required for revivifying said caustic. In this particular example, I air treated for 3 hours and the temperature of the caustic was maintained at about 150° F. Also steam coils may be used in the air treater 18 to maintain the temperature of the caustic during the air treating operation. After the caustic has been revivified, it is recycled by the pump 21 to the mixer 13 where it is reused. If the sodium hydroxide content of the used caustic is not reduced below a concentration that is effective for treating, it may be recycled until depleted without being revivified. For this modification, the used caustic is by-passed through the valved line 22. Generally it is desirable to revivify the caustic when the sodium hydroxide concentration falls to about 10 or 12%. By the aid of caustic regeneration I can use a given quantity of caustic a great number of times, whereas, without the step of regeneration, the caustic can be used only a few times before it is exhausted. The depletion of the amount of caustic is caused by entrainment in the naphtha leaving the treater 14, and very little, if any, of the caustic is lost by chemical action. Drain lines 23 and 24 are provided on the treater 14 and air treater 18 respectively, whereby waste materials may be removed if necessary.

Continuing the first stage treatment, the stabilized naphtha in the treater 14 is then withdrawn through the line 25 and introduced into the mixer 26 where it is contacted with doctor. To start my process I use the conventional doctor solution which contains about 2 to 3% of litharge dissolved in a 10 to 15% sodium hydroxide solution. The mixture of doctor and stabilized naphtha is then introduced into the treater 27 where part of the doctor is allowed to settle. The naphtha and remaining suspended doctor are then passed into the second treater 28 where the last portion of doctor is separated from the sweetened stabilized naphtha. Also, other treaters may be used if desired. The sweetened stabilized naphtha, or depropanized naphtha, is introduced into the settler 29 where further doctor and any extraneous material is allowed to settle out and be withdrawn by the valved line 30 and returned to the mixer 26. The sweetened stabilized naphtha is withdrawn from the settler 29 through the valved line 31 for storage, or given a water wash if desired.

The doctor used to treat the stabilized naphtha in treaters 27 and 28 is removed therefrom through the valved draw-off lines 32 and 33 respectively. These draw-off lines should be located at or slightly below the interface between the doctor and naphtha. The doctor solution is continuously withdrawn from the separators and recycled to the mixer 26 by the pump 34. A make-up line 35 is provided so that additional doctor may be added at intervals if necessary. The valved lines 32a and 33a are used to remove the settled doctor that accumulates in the bottom of the treaters 27 and 28 respectively. The recycling of the doctor is continued until the available litharge content falls below about 0.4 to 0.5%. This used doctor solution is now ineffective for treating the stabilized naphtha and it must be revivified if it is to be further used in the first stage of my process. The used doctor is then introduced into the storage tank 36 by the valved line 37. The regeneration of the used doctor will be described hereinafter in connection with the treating of unstabilized naphthas in the second stage of my process. This used doctor contains lead sulfide, sodium hydroxide and some sulfur-bearing organic compounds, although the exact composition of this used doctor is obscure.

The second stage of my process pertains to the sweetening of unstabilized naphthas or naphthas that have not been deprived of the low boiling fraction such as by depropanizing, and in this particular example I used an unstabilized pressure distillate. The unstabilized naphtha is introduced into the settler 38 where water and any extraneous materials are allowed to separate therefrom, and they are withdrawn by the valved draw-off line 39. The substantially water-free unstabilized naphtha is then introduced into the mixer 40, which may be of the orifice type, where it is contacted with the spent doctor obtained from the treatment of stabilized naphtha in the first stage of my process. This spent doctor whose general composition is referred to above, is withdrawn from the storage tank 36 through the valved line 41 and introduced into the mixer 40. I have found that this used doctor is very effective for sweetening the unstabilized naphthas treated in the second stage of my process. The mixture of naphtha and used doctor is then passed from the mixer 40 to the treater 42 and then to the treater 43 where most of the remaining doctor is allowed to separate therefrom. The sweetened unstabilized naphtha is then passed to the settler 44 where water and small amounts of doctor are removed through the valved draw-off 45 and returned to the mixer 40. The sweet unstabilized naphtha leaving the settler 44 is then placed in suitable storage or given a water wash before storage.

The doctor separated from the separators 42 and 43 is withdrawn, at or slightly below the interface between the settled doctor and naphtha, by the lines 46 and 47 respectively. This doctor is recycled by the pump 48 to the mixer 40, where it is reused. The valves 46a and 47a are used to remove the settled doctor that accumulates in the bottom of the treaters. I have discovered the unusual phenomenon that this used doctor, which was obtained from the first stage, sweetens the unstabilized naphtha as it is recycled thru the mixer 40 and treaters 42 and 43, and at the same time it increases its litharge content. As pointed out above, the litharge content of the used doctor that came from the first stage was about 0.4%. After about 150 barrels of this doctor has been used to treat 15,000 barrels of unstabilized naphtha, its litharge content builds up to about 1.1%. After the litharge content of the doctor is restored to about 1 or 1.1%, it may be returned to the mixer 26 in the first stage of my process, by the valved line 49, and used to sweeten the stabilized naphtha. As this doctor is used to sweeten the stabilized naphtha in the first stage of my process it gradually loses its litharge content and when the litharge concentration falls to about 0.4% it is returned to the second stage of my process and used to sweeten the heavy naphthas. During this sweetening operation of the unstabilized naphthas in the second stage, the litharge content of the doctor is restored in situ to about 1 to 1.1% concentration. This recycling of used doctor from the first stage to the second stage and the sweetening and revivification in the second stage and recycling from the second stage to the first stage may be continued indefinitely without the chemical loss of doctor. It should be noted that I do not use air blowing in the second stage of my process. The explanation of the sweetening effect of doctor in the second stage and the simultaneous revivification of the doctor is very obscure. I have not found a plausible explanation for this phenomenal action.

After the effective litharge content of the doctor in treaters 42 and 43 has built up to about 1.1%, it does not continue to gain in its effective litharge content. In fact, the sweetening agent, or doctor, seems to come to an equilibrium. The explanation for the increase of litharge content to 1.1% and the apparent equilibrium established at this point is not understood. Therefore, after the doctor has been revivified to about 1.1% litharge content, it may be recycled indefinitely in the second stage and used to sweeten unstabilized naphtha. But each time the revivified doctor is returned to the first stage, its effective litharge content soon decreases, and when the litharge content falls to about 0.5 or 0.4%, it can be returned to the second phase and revivified to a litharge content of about 1.1%.

I have found that a small amount of sulfur may be added to the naphthas in either stage of my process before it is treated with doctor in order to hasten the rate of settling in the treaters. A suitable feed line such as shown at 50 is provided for introducing a small amount of sulfur or hydrogen sulfide into the system.

My process may be operated batchwise or as a continuous process. Also, the process may be operated by removing only a part of the used doctor from the first stage and passing it to the second stage, and only a part of the revivified doctor in the second stage may be recycled to the first stage.

The sweetened stabilized and unstabilized naphthas prepared by my process do not become sour upon standing and they will pass all standard tests for determining sweetness. Also, these sweetened naphthas have very good color.

While my invention has been described in connection with certain details of operation, it is understood that my invention is not limited thereby except insofar as these details are included in the appended claims.

I claim:

1. The process of sweetening stabilized hydrocarbon naphthas and unstabilized hydrocarbon naphthas which comprises contacting the stabilized naphtha with a caustic alkaline solution, then contacting the stabilized naphtha with a sodium plumbite solution, separating the sweetened stabilized naphtha from the used sodium plumbite solution, contacting unstabilized naphtha with the used sodium plumbite solution, thereby simultaneously sweetening the unstabilized naphtha and regenerating the effectiveness of the sodium plumbite solution, and separating the regenerated sodium plumbite solution from the sweetened unstabilized naphtha and recycling the regenerated sodium plumbite solution to further sweeten stabilized naphtha.

2. The process of sweetening stabilized hydrocarbon naphthas and unstabilized hydrocarbon naphthas which comprises contacting the stabilized naphthas with an aqueous caustic solution, then contacting the stabilized naphtha with an aqueous caustic solution of litharge, separating the sweetened stabilized naphtha from the used aqueous caustic solution of litharge, contacting unstabilized naphtha with the used aqueous caustic solution of litharge, thereby simultaneously sweetening the unstabilized naphtha and regenerating the effectiveness of the aqueous caustic solution of litharge, separating the regenerated aqueous caustic solution of litharge from the sweetened unstabilized naphtha, and recycling the regenerated aqueous caustic solution of litharge to further sweeten stabilized naphtha.

3. The process of sweetening stabilized naphthas and unstabilized naphthas which comprises treating the stabilized naphthas with an aqueous caustic solution, then treating the stabilized naphthas with an alkaline aqueous solution of sodium plumbite, separating the sweetened stabilized naphtha from the used solution of sodium plumbite, treating unstabilized naphtha with the used alkaline aqueous solution of sodium plumbite, thereby simultaneously sweetening the unstabilized naphtha and regenerating the effectiveness of the alkaline aqueous solution of sodium plumbite, and separating the regenerated plumbite solution from the sweetened unstabilized naphtha and recycling the regenerated alkaline aqueous solution of sodium plumbite to further sweeten unstabilized light naphtha.

4. The process of sweetening stabilized naphthas and unstabilized naphthas which comprises treating the stabilized naphthas with an aqueous solution of sodium hydroxide, then treating the stabilized naphthas with an alkaline sodium plumbite solution, separating the sweetened stabilized naphthas from the used sodium plumbite solution, treating unstabilized naphthas with the used sodium plumbite solution, thereby simultaneously sweetening the unstabilized naphthas and regenerating the effectiveness of the sodium plumbite solution in situ, and separating the regenerated sodium plumbite solution from the sweentened unstabilized naphthas and recycling the regenerated sodium plumbite solution to sweeten stabilized naphthas.

5. The process of sweetening stabilized hydrocarbon naphthas and unstabilized hydrocarbon naphthas which comprises treating the stabilized hydrocarbon naphthas with an aqueous solution of sodium hydroxide, then treating the stabilized hydrocarbon naphthas with an alkaline solution of sodium plumbite, separating the sweetened stabilized hydrocarbon naphthas from the used alkaline solution of sodium plumbite, treating unstabilized hydrocarbon naphthas with the used alkaline sodium plumbite solution, thereby simultaneously sweetening the unstabilized hydrocarbon naphthas and regenerating the effectiveness of the alkaline sodium plumbite solution in situ, and separating the regenerated alkaline solution of sodium plumbite from the sweetened unstabilized hydrocarbon naphthas.

6. The process of sweetening stabilized hydrocarbon naphthas and unstabilized hydrocarbon naphthas which comprises treating the stabilized hydrocarbon naphthas with an aqueous sodium hydroxide solution, regenerating the aqueous sodium hydroxide solution by blowing with air and then recycling said regenerated solution to further treat stabilized light hydrocarbon naphthas, then treating the stabilized hydrocarbon naphthas with an alkaline sodium plumbite solution, separating the sweetened stabilized hydrocarbon naphthas from the used alkaline solution of sodium plumbite, treating unstabilized hydrocarbon naphthas with the used alkaline solution of sodium plumbite, thereby simultaneously sweetening the unstabilized hydrocarbon naphthas and regenerating the effectiveness of the alkaline solution of sodium plumbite in situ, and separating the regenerated alkaline solution of sodium plumbite from the sweetened unstabilized hydrocarbon naphthas.

7. The process of sweetening stabilized hydrocarbon naphthas and unstabilized hydrocarbon naphthas which comprises, treating the stabilized hydrocarbon naphthas with an aqueous caustic solution, then treating the stabilized naphthas with an alkaline sodium plumbite solution, separating the sweetened hydrocarbon naphthas from the used alkaline sodium plumbite solution, treating unstabilized hydrocarbon naphthas with the used alkaline sodium plumbite solution, thereby simultaneously sweetening the unstabilized hydrocarbon naphthas and regenerating the effectiveness of the alkaline sodium plumbite solution, separating the regenerated alkaline sodium plumbite solution from the sweetened unstabilized hydrocarbon naphthas, and recycling the regenerated alkaline sodium plumbite solution to further sweeten the unstabilized hydrocarbon naphthas.

8. The process of sweetening unstabilized hydrocarbon naphthas which comprises, treating the unstabilized hydrocarbon naphthas with an alkaline solution of sodium plumbite which has been used to sweeten stabilized hydrocarbon naphthas, thereby sweetening the unstabilized naphtha and simultaneously therewith regenerating in situ the litharge content of the alkaline solution of sodium plumbite, separating the used alkaline solution of sodium plumbite from the sweetened unstabilized hydrocarbon naphthas, and recycling the used alkaline solution of sodium plumbite to further sweeten unstabilized hydrocarbon naphthas.

9. The process of sweetening unstabilized hydrocarbon naphthas which comprises, treating the unstabilized hydrocarbon naphthas with an alkaline solution of sodium plumbite which has been used to sweeten depropanized hydrocarbon naphthas, thereby sweetening the unstabilized naphtha and simultaneously therewith regenerating the effectiveness of the sodium plumbite solution, separating the regenerated alkaline solution of sodium plumbite from the sweetened unstabilized hydrocarbon naphthas, and reusing the regenerated alkaline solution of sodium plumbite to further sweeten unstabilized hydrocarbon naphthas.

10. The process of sweetening undepropanized hydrocarbon naphthas which comprises, treating the undepropanized hydrocarbon naphthas with an alkaline solution of sodium plumbite which has been used to sweeten depropanized hydrocarbon naphthas, thereby sweetening the undepropanized naphtha and simultaneously therewith regenerating the effectiveness of the sodium plumbite solution, separating the used alkaline solution of sodium plumbite from the sweetened undepropanized hydrocarbon naphthas, and continuously reusing the alkaline solution of sodium plumbite to further sweeten undepropanized hydrocarbon naphthas.

11. The process of sweetening stabilized hydrocarbon naphthas and unstabilized hydrocarbon naphthas which comprises contacting the stabilized naphtha with a caustic alkaline solution, separating the stabilized naphtha from the caustic, then contacting a stabilized naphtha with a sodium plumbite solution, separating the sweetened stabilized naphtha from the used sodium plumbite solution, contacting unstabilized naphtha with the used sodium plumbite solution, and thereby simultaneously sweetening the unstabilized naphtha and regenerating the effectiveness of the sodium plumbite solution, settling the sodium plumbite solution and unstabilized naphtha, withdrawing the sodium plumbite solution from the sweetened unstabilized naphtha at the interface between the sodium plumbite solution and naphtha, and recycling the regenerated sodium plumbite solution to further sweeten stabilized naphtha.

12. The process of sweetening stabilized hydrocarbon naphthas and unstabilized hydrocarbon naphthas, which comprises treating the stabilized hydrocarbon naphthas with an aqueous solution of sodium hydroxide, separating the stabilized naphtha from sodium hydroxide solution, then contacting the stabilized hydrocarbon naphthas with an alkaline solution of sodium plumbite, separating the sweetened stabilized hydrocarbon naphthas from the used sodium plumbite solution, treating unstabilized hydrocarbon naphthas with the used alkaline sodium plumbite solution, thereby sweetening the unstabilized naphthas and simultaneously therewith regenerating the effectiveness of the sodium plumbite solution, settling the used alkaline sodium plumbite solution from the sweetened unstabilized hydrocarbon naphthas, withdrawing the used alkaline sodium plumbite solution slightly below the interface between the used alkaline solution of sodium plumbite and unstabilized naphtha, and recycling the used alkaline solution of sodium plumbite to further sweeten unstabilized hydrocarbon naphthas.

13. The process of sweetening stabilized naphthas and unstabilized naphthas, which comprises treating the stabilized naphthas with an aqueous solution of sodium hydroxide, then treating the stabilized naphthas with doctor solution, separating the sweetened stabilized naphthas from the used doctor solution, reacting unstabilized naphthas with the used doctor solution and thereby simultaneously sweetening the unstabilized naphthas and regenerating the effectiveness of the doctor solution in situ, separating the regenerated doctor solution at the interface between the sweetened unstabilized naphtha and regenerated doctor solution, and recycling the regenerated doctor solution to further sweeten unstabilized naphthas.

14. The process of sweetening unstabilized hydrocarbon naphthas which comprises, treating the unstabilized hydrocarbon naphthas with an alkaline solution of sodium plumbite which has been used to sweeten stabilized hydrocarbon naphthas, thereby sweetening the unstabilized naphtha and simultaneously therewith regenerating the effectiveness of the sodium plumbite solution, separating the used alkaline solution of sodium plumbite at the interface between the sweetened unstabilized hydrocarbon naphthas and regenerated alkaline solution of sodium plumbite, and recycling the used alkaline solution of sodium plumbite to further sweeten unstabilized hydrocarbon naphthas.

15. The process of sweetening unstabilized hydrocarbon naphthas which comprises, treating the unstabilized hydrocarbon naphthas with an alkaline solution of sodium plumbite which has been used to sweeten freshly depropanized hydrocarbon naphthas, thereby sweetening the unstabilized naphtha and simultaneously therewith regenerating the effectiveness of the sodium plumbite solution, separating the used alkaline solution of sodium plumbite from the interface between the sweetened unstabilized hydrocarbon naphthas and used alkaline solution of sodium plumbite, and reusing the alkaline solution of sodium plumbite to further sweeten unstabilized hydrocarbon naphthas.

16. The process of sweetening depropanized light hydrocarbon naphthas and undepropanized light hydrocarbon naphthas which comprises contacting the depropanized naphthas with an aqueous caustic solution, separating the depropanized naphtha from the aqueous caustic solution, then contacting the depropanized naphtha with a sodium plumbite solution, separating the sweetened depropanized naphtha from the used sodium plumbite solution, contacting undepropanized light naphtha with the used sodium plumbite solution, adding a small amount of sulfur to the undepropanized naphtha, and thereby simultaneously sweetening the undepropanized naphtha and revivifying the effectiveness of the sodium plumbite solution, settling the sodium plumbite solution and undepropanized naphtha. Withdrawing the sodium plumbite solution from the sweetened undepropanized naphtha at the interface between the sodium plumbite solution and undepropanized naphtha, and then recycling the regenerated sodium plumbite to further sweeten depropanized naphthas.

17. The process of sweetening depropanized naphthas and undepropanized naphthas which comprises contacting the depropanized naphtha with an aqueous solution of sodium hydroxide, separating the depropanized naphtha from the sodium hydroxide solution, heating said sodium hydroxide solution and then contacting it with air to revivify the same, recycling said revivified aqueous sodium hydroxide solution to further treat depropanized naphthas, then contacting the depropanized naphtha with a sodium plumbite solution, separating the sweetened depropanized naphtha from the used sodium plumbite solution, contacting undepropanized naphtha with the used sodium plumbite solution in the presence of a small amount of a reagent selected from the group consisting of sulfur and hydrogen sulfide, and thereby simultaneously sweetening the undepropanized naphtha and regenerating the effectiveness of the sodium plumbite solution, settling the sodium plumbite solution and undepropanized naphtha, withdrawing the sodium plumbite solution from the sweetened undepropanized naphtha in the interface between the sodium plumbite solution and naphtha, and recycling the regenerated sodium plumbite solution to further sweeten depropanized naphtha.

18. The process of sweetening unstabilized hydrocarbon naphthas which comprises, treating the unstabilized hydrocarbon naphtha with doctor solution which has been used to sweeten stabilized hydrocarbon naphthas, thereby sweetening the unstabilized naphtha and simultaneously therewith regenerating the effectiveness of the doctor solution, and separating the regenerated doctor solution from the sweetened unstabilized hydrocarbon naphtha.

19. In the process of sweetening stabilized hydrocarbon naphthas and unstabilized hydrocarbon naphthas, the steps comprising treating the stabilized hydrocarbon naphtha with an aqueous caustic solution, regenerating the aqueous caustic solution by blowing with air and then recycling said regenerated caustic solution to further treat stabilized hydrocarbon naphthas, then treating the stabilized hydrocarbon naphtha with doctor solution, separating the used doctor solution from the sweetened stabilized naphtha, then contacting unstabilized naphtha with the used doctor solution, thereby sweetening the unstabilized naphtha and simultaneously therewith regenerating the effectiveness of the doctor solution, and separating the regenerated doctor solution from the sweetened unstabilized naphtha.

ARTHUR F. ENDRES.